United States Patent
Kakutani

(10) Patent No.: US 7,898,693 B2
(45) Date of Patent: Mar. 1, 2011

(54) FAST GENERATION OF DITHER MATRIX

(75) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1034 days.

(21) Appl. No.: 11/643,748

(22) Filed: Dec. 20, 2006

(65) Prior Publication Data

US 2007/0153333 A1 Jul. 5, 2007

(30) Foreign Application Priority Data

Dec. 22, 2005 (JP) .............................. 2005-369299

(51) Int. Cl.
- *H04N 1/00* (2006.01)
- *H04N 1/40* (2006.01)
- *H04N 1/46* (2006.01)
- *H04N 1/405* (2006.01)

(52) U.S. Cl. ...................... 358/3.13; 358/3.09; 358/3.1; 358/3.11; 358/3.12; 358/3.14; 358/3.15; 358/3.16; 358/3.17; 358/3.18; 358/3.19; 358/406; 358/466; 358/504; 358/535

(58) Field of Classification Search ........................ None
See application file for complete search history.

(56) References Cited

FOREIGN PATENT DOCUMENTS

| JP | 07-081190 | 3/1995 |
|---|---|---|
| JP | 07-177351 | 7/1995 |
| JP | 10-329381 | 12/1998 |
| JP | 2001-298617 | 10/2001 |

OTHER PUBLICATIONS

Abstract of Japanese Patent Publication No. 07-081190, Pub. Date: Mar. 28, 1995, Patent Abstracts of Japan.
Abstract of Japanese Patent Publication No. 07-177351, Pub. Date: Jul. 14, 1995, Patent Abstracts of Japan.
Abstract of Japanese Patent Publication No. 10-329381, Pub. Date: Dec. 15, 1998, Patent Abstracts of Japan.
Abstract of Japanese Patent Publication No. 2001-298617, Pub. Date: Oct. 26, 2001, Patent Abstracts of Japan.

*Primary Examiner*—Mark K Zimmerman
*Assistant Examiner*—Haris Sabah
(74) *Attorney, Agent, or Firm*—Martine Penilla & Gencarella, LLP

(57) ABSTRACT

This invention provides a method of generating a dither matrix that stores each of a plurality of threshold values in each of elements for determining a status of dot formation of each print pixel of a print image to be produced on a printing medium by carrying out halftone processing on image data. The method includes: an evaluation value determining step of determining a second evaluation value for a second dot status based on a first evaluation value and an evaluation value change level, the first evaluation value being for a first dot status prior to determination of a storage element of a targeted threshold value among the plurality of threshold values, the second dot status hypothetically presuming that the storage element of the targeted threshold value has been determined, the evaluation value change level representing a level of variation of the evaluation value associated with change from the first dot status to the second dot status; a storage element determining step of determining an element for storing the targeted threshold value based on the determined second evaluation value; and a repeating step of repeating the evaluation value determining step and the storage element determining step, for at least some of the plurality of threshold values.

10 Claims, 21 Drawing Sheets $$VTF(u) = 5.05 \cdot \exp\left(\frac{-0.138\,\pi\,L\cdot u}{180}\right)$$
$$\cdot \left\{1-\exp\left(\frac{-0.1\,\pi\,L\cdot u}{180}\right)\right\}$$

$$\text{GRAININESS INDEX} = K \int FS(u) \cdot VTF(u)\,du$$

Fig.9

DOT ON/OFF STATUS (ALL PIXELS)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  |  |  |  | ● |
| COLUMN 7 |  |  |  | ● |  |  |  |  |
| COLUMN 8 |  |  |  |  |  |  | ● |  |

Fig.10

DOT ON/OFF STATUS (NUMERIC CONVERSION)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 1 |
| COLUMN 7 | 0 | 0 | 0 | 1 | 0 | 0 | 0 | 0 |
| COLUMN 8 | 0 | 0 | 0 | 0 | 0 | 0 | 1 | 0 |

Fig.11

|  | ROW 1 | ROW 2 | ROW 3 | ROW 4 | ROW 5 |
|---|---|---|---|---|---|
| COLUMN 1 | 0 | 1 | 2 | 1 | 0 |
| COLUMN 2 | 1 | 3 | 4 | 3 | 1 |
| COLUMN 3 | 2 | 4 | 5 | 4 | 2 |
| COLUMN 4 | 1 | 3 | 4 | 3 | 1 |
| COLUMN 5 | 0 | 1 | 2 | 1 | 0 |

Fig.12

|  | 1 | 2 | 3 | 4 | 5 | 6 | 7 | 8 |  |  |  |  |  |  |  |  |  |  |  |  |  |
|---|---|---|---|---|---|---|---|---|---|---|---|---|---|---|---|---|---|---|---|---|---|---|
|  | 0 | 0 | 0 | 0 | 1 | 0 | 0 | 0 | 0 | 0 | 0 | 1 | 0 | 0 | 0 | 0 | 0 | 0 | 1 | 0 | 0 |
|  | 0 | 1 | 0 | 0 | 0 | 0 | 0 | 0 | 1 | 0 | 0 | 0 | 0 | 0 | 0 | 0 | 1 | 0 | 0 | 0 | 0 |
|  | 0 | 0 | 0 | 0 | 0 | 1 | 0 | 0 | 0 | 0 | 0 | 0 | 1 | 0 | 0 | 0 | 0 | 0 | 0 | 1 | 0 |
|  | 1 | 0 | 0 | 0 | 0 | 0 | 0 | 0 | 1 | 0 | 0 | 0 | 0 | 0 | 0 | 1 | 0 | 0 | 0 | 0 | 0 |
|  | 0 | 0 | 1 | 0 | 0 | 0 | 0 | 0 | 0 | 1 | 0 | 0 | 0 | 0 | 0 | 0 | 1 | 0 | 0 | 0 | 0 |
|  | 0 | 0 | 0 | 0 | 0 | 0 | 0 | 1 | 0 | 0 | 0 | 0 | 0 | 0 | 1 | 0 | 0 | 0 | 0 | 0 | 1 |
|  | 0 | 0 | 0 | 1 | 0 | 0 | 0 | 0 | 0 | 0 | 1 | 0 | 0 | 0 | 0 | 0 | 0 | 1 | 0 | 0 | 0 |
|  | 0 | 0 | 0 | 0 | 0 | 1 | 0 | 0 | 0 | 0 | 0 | 0 | 0 | 1 | 0 | 0 | 0 | 0 | 0 | 0 | 1 | 0 |
| 1 | 0 | 0 | 0 | 0 | 1 | 0 | 0 | 0 | 0 | 0 | 0 | 1 | 0 | 0 | 0 | 0 | 0 | 0 | 1 | 0 | 0 |
| 2 | 0 | 1 | 0 | 0 | 0 | 0 | 0 | 0 | 0 | 1 | 0 | 0 | 0 | 0 | 0 | 0 | 1 | 0 | 0 | 0 | 0 |
| 3 | 0 | 0 | 0 | 0 | 0 | 1 | 0 | 0 | 0 | 0 | 0 | 0 | 1 | 0 | 0 | 0 | 0 | 0 | 0 | 1 | 0 | 0 |
| 4 | 1 | 0 | 0 | 0 | 0 | 0 | 0 | 0 | 1 | 0 | 0 | 0 | 0 | 0 | 0 | 1 | 0 | 0 | 0 | 0 | 0 |
| 5 | 0 | 0 | 1 | 0 | 0 | 0 | 0 | 0 | 0 | 1 | 0 | 0 | 0 | 0 | 0 | 0 | 1 | 0 | 0 | 0 | 0 |
| 6 | 0 | 0 | 0 | 0 | 0 | 0 | 0 | 1 | 0 | 0 | 0 | 0 | 0 | 0 | 1 | 0 | 0 | 0 | 0 | 0 | 1 |
| 7 | 0 | 0 | 0 | 1 | 0 | 0 | 0 | 0 | 0 | 0 | 1 | 0 | 0 | 0 | 0 | 0 | 0 | 1 | 0 | 0 | 0 |
| 8 | 0 | 0 | 0 | 0 | 0 | 0 | 1 | 0 | 0 | 0 | 0 | 0 | 0 | 1 | 0 | 0 | 0 | 0 | 0 | 0 | 1 | 0 |
|  | 0 | 0 | 0 | 0 | 1 | 0 | 0 | 0 | 0 | 0 | 0 | 1 | 0 | 0 | 0 | 0 | 0 | 0 | 1 | 0 | 0 | 0 |
|  | 0 | 1 | 0 | 0 | 0 | 0 | 0 | 0 | 1 | 0 | 0 | 0 | 0 | 0 | 0 | 1 | 0 | 0 | 0 | 0 | 0 |
|  | 0 | 0 | 0 | 0 | 1 | 0 | 0 | 0 | 0 | 0 | 0 | 1 | 0 | 0 | 0 | 0 | 0 | 1 | 0 | 0 |
|  | 1 | 0 | 0 | 0 | 0 | 0 | 0 | 1 | 0 | 0 | 0 | 0 | 0 | 0 | 1 | 0 | 0 | 0 | 0 | 0 | 0 |
|  | 0 | 0 | 1 | 0 | 0 | 0 | 0 | 0 | 0 | 1 | 0 | 0 | 0 | 0 | 0 | 0 | 1 | 0 | 0 | 0 | 0 |
|  | 0 | 0 | 0 | 0 | 0 | 0 | 1 | 0 | 0 | 0 | 0 | 0 | 0 | 1 | 0 | 0 | 0 | 0 | 0 | 0 | 1 |
|  | 0 | 0 | 0 | 1 | 0 | 0 | 0 | 0 | 0 | 0 | 1 | 0 | 0 | 0 | 0 | 0 | 1 | 0 | 0 | 0 | 0 |
|  | 0 | 0 | 0 | 0 | 0 | 0 | 1 | 0 | 0 | 0 | 0 | 0 | 0 | 1 | 0 | 0 | 0 | 0 | 0 | 1 | 0 |

Fig.13

LOW PASS FILTER PROCESS RESULT VALUES (OVERALL DENSITY)

|          | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 5 | 6 | 6 | 5 | 6 |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 | 7 | 7 | 7 | 7 | 4 | 4 | 6 | 7 |
| COLUMN 7 | 4 | 4 | 6 | 7 | 7 | 7 | 7 | 7 |
| COLUMN 8 | 4 | 3 | 5 | 7 | 9 | 8 | 7 | 6 |

Fig.14

EQUATION DEFINING RMS GRANULARITY

$$\text{RMS GRANULARITY} = \sqrt{\frac{\sum (\text{DENSITY VALUE} - \text{AVERAGE DENSITY VALUE})^2}{\text{PIXEL COUNT}}}$$

Fig.15

EQUATION USE FOR FAST COMPUTATION OF RMS GRANULARITY

$$\text{RMS GRANULARITY} = \sqrt{\frac{\sum \text{DENSITY VALUE}^2}{\text{PIXEL COUNT}} - \frac{(\sum \text{DENSITY VALUE})^2}{\text{PIXEL COUNT}^2}}$$

Fig.16

DENSITY VALUES BEFORE NEW DOT FORMATION
(TARGETED ELEMENTS: 5 X 5)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 5 | 6 | 6 | 5 | 6 |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 | 7 | 7 | 7 | 7 | 4 | 4 | 6 | 7 |
| COLUMN 7 | 4 | 4 | 6 | 7 | 7 | 7 | 7 | 7 |
| COLUMN 8 | 4 | 3 | 5 | 7 | 9 | 8 | 7 | 6 |

—Fp1

RMS GRANULARITY: 1.54 (NEW DOTS NOT YET FORMED)

Fig.17

DENSITY VALUES AFTER NEW DOT FORMATION
(TARGETED ELEMENTS: 5 X 5)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 6 | 8 | 7 | 5 | 6 |
| COLUMN 4 | 8 | 9 | 8 | 7 | 8 | 7 | 7 | 7 |
| COLUMN 5 | 9 | 8 | 9 | 10 | 9 | 7 | 7 | 7 |
| COLUMN 6 | 7 | 7 | 8 | 10 | 8 | 7 | 7 | 7 |
| COLUMN 7 | 4 | 4 | 6 | 8 | 9 | 8 | 7 | 7 |
| COLUMN 8 | 4 | 3 | 5 | 7 | 9 | 8 | 7 | 6 |

—Fr1
—Fp1

RMS GRANULARITY: 1.55 (AFTER NEW DOTS FORMED)

Fig.18

DENSITY VALUES BEFORE NEW DOT FORMATION
(TARGETED ELEMENTS: 1 X 1)

| Fp2 | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 5 | 6 | 6 | 5 | 6 |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 | 7 | 7 | 7 | 7 | 4 | 4 | 6 | 7 |
| COLUMN 7 | 4 | 4 | 6 | 7 | 7 | 7 | 7 | 7 |
| COLUMN 8 | 4 | 3 | 5 | 7 | 9 | 8 | 7 | 6 |

RMS GRANULARITY: 1.54 (NEW DOTS NOT YET FORMED)

Fig.19

DENSITY VALUES AFTER NEW DOT FORMATION
(TARGETED ELEMENTS: 1 X 1)

| Fp2 | ROW 1 | ROW 2 | ROW 3 | ROW 4 | ROW 5 | ROW 6 | ROW 7 | ROW 8 |
|---|---|---|---|---|---|---|---|---|
| COLUMN 1 | 9 | 8 | 8 | 7 | 8 | 9 | 7 | 5 |
| COLUMN 2 | 10 | 9 | 6 | 6 | 7 | 8 | 7 | 8 |
| COLUMN 3 Fp2a | 9 | 9 | 6 | 5 | 6 | 6 | 7 | 10 Fp2c |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 Fp2b | 7 | 7 | 7 | 7 | 4 | 4 | 6 | 7 Fp2d |
| COLUMN 7 | 6 | 5 | 6 | 7 | 7 | 7 | 7 | 8 |
| COLUMN 8 | 8 | 6 | 6 | 7 | 9 | 8 | 8 | 9 |

RMS GRANULARITY: 1.59 (AFTER NEW DOTS FORMED)

Fig.21

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

|  | 1 | 2 | 3 | 4 | 5 | 6 | 7 | 8 |
|---|---|---|---|---|---|---|---|---|
| 1 | 0 |  | 0 |  | 0 |  | 0 |  |
| 2 |  |  |  |  |  |  |  |  |
| 3 | 0 |  | 0 |  | 0 |  | 0 |  |
| 4 |  |  |  |  |  |  |  |  |
| 5 | 0 |  | 0 |  | 0 |  | 0 |  |
| 6 |  |  |  |  |  |  |  |  |
| 7 | 0 |  | 0 |  | 0 |  | 0 |  |
| 8 |  |  |  |  |  |  |  |  |

M1:

|  | 1 | 2 | 3 | 4 | 5 | 6 | 7 | 8 |
|---|---|---|---|---|---|---|---|---|
| 1 |  | 1 |  | 1 |  | 1 |  | 1 |
| 2 |  |  |  |  |  |  |  |  |
| 3 |  | 1 |  | 1 |  | 1 |  | 1 |
| 4 |  |  |  |  |  |  |  |  |
| 5 |  | 1 |  | 1 |  | 1 |  | 1 |
| 6 |  |  |  |  |  |  |  |  |
| 7 |  | 1 |  | 1 |  | 1 |  | 1 |
| 8 |  |  |  |  |  |  |  |  |

M2:

|  | 1 | 2 | 3 | 4 | 5 | 6 | 7 | 8 |
|---|---|---|---|---|---|---|---|---|
| 1 |  |  |  |  |  |  |  |  |
| 2 | 2 |  | 2 |  | 2 |  | 2 |  |
| 3 |  |  |  |  |  |  |  |  |
| 4 | 2 |  | 2 |  | 2 |  | 2 |  |
| 5 |  |  |  |  |  |  |  |  |
| 6 | 2 |  | 2 |  | 2 |  | 2 |  |
| 7 |  |  |  |  |  |  |  |  |
| 8 | 2 |  | 2 |  | 2 |  | 2 |  |

M3:

|  | 1 | 2 | 3 | 4 | 5 | 6 | 7 | 8 |
|---|---|---|---|---|---|---|---|---|
| 1 |  |  |  |  |  |  |  |  |
| 2 |  | 3 |  | 3 |  | 3 |  | 3 |
| 3 |  |  |  |  |  |  |  |  |
| 4 |  | 3 |  | 3 |  | 3 |  | 3 |
| 5 |  |  |  |  |  |  |  |  |
| 6 |  | 3 |  | 3 |  | 3 |  | 3 |
| 7 |  |  |  |  |  |  |  |  |
| 8 |  | 3 |  | 3 |  | 3 |  | 3 |

Fig.24

DOT ON/OFF STATUS
(PIXELS CORRESPONDING TO DIVIDED MATRIX M0)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  |  |  |  |  |  |  |  |
| COLUMN 3 |  |  |  |  |  |  |  |  |
| COLUMN 4 |  |  |  |  |  |  |  |  |
| COLUMN 5 |  |  | ● |  |  |  |  |  |
| COLUMN 6 |  |  |  |  |  |  |  |  |
| COLUMN 7 |  |  |  |  |  |  |  |  |
| COLUMN 8 |  |  |  |  |  |  |  |  |

Fig.25

DOT ON/OFF STATUS (NUMERICAL CONVERSION)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 0 | 0 | 0 | 0 | 0 |
| COLUMN 8 | 0 | 0 | 0 | 0 | 0 | 0 | 0 | 0 |

Fig.26

**LOW PASS FILTER PROCESS RESULT VALUES
(GROUP DENSITY VALUES)**

|   | 1 | 2 | 3 | 4 | 5 | 6 | 7 | 8 |
|---|---|---|---|---|---|---|---|---|
| 1 | 0 | 0 | 2 | 4 | 5 | 4 | 2 | 0 |
| 2 | 0 | 0 | 1 | 3 | 4 | 3 | 1 | 0 |
| 3 | 0 | 1 | 2 | 2 | 2 | 1 | 0 | 0 |
| 4 | 1 | 3 | 4 | 3 | 1 | 0 | 0 | 0 |
| 5 | 2 | 4 | 5 | 4 | 2 | 0 | 0 | 0 |
| 6 | 1 | 3 | 4 | 3 | 1 | 0 | 0 | 0 |
| 7 | 0 | 1 | 2 | 2 | 2 | 1 | 0 | 0 |
| 8 | 0 | 0 | 1 | 3 | 4 | 3 | 1 | 0 |

Fig.27

$$F(u,v) = \sum_{y=0}^{N-1} \sum_{x=0}^{N-1} f(x,y) e^{-i2\pi(ux+vy)/N} \qquad u,v=0,1,2,...,N-1$$

Fig.28

$$\begin{aligned}F(u,v) = \ &f(0,0)e^{-i2\pi(u*0+v*0)/N} &&+ f(1,0)e^{-i2\pi(u*1+v*0)/N} &&+ \cdots + f(N-1,0)e^{-i2\pi(u*(N-1)+v*0)/N} &&+ \\ &f(0,1)e^{-i2\pi(u*0+v*1)/N} &&+ f(1,1)e^{-i2\pi(u*1+v*1)/N} &&+ \cdots + f(N-1,1)e^{-i2\pi(u*(N-1)+v*1)/N} &&+ \\ &f(0,2)e^{-i2\pi(u*0+v*2)/N} &&+ f(1,2)e^{-i2\pi(u*1+v*2)/N} &&+ \cdots + f(N-1,2)e^{-i2\pi(u*(N-1)+v*2)/N} &&+ \\ &\quad\cdots \\ &f(0,N-1)e^{-i2\pi(u*0+v*(N-1))/N} &&+ f(1,N-1)e^{-i2\pi(u*1+v*(N-1))/N} &&+ \cdots + f(N-1,N-1)e^{-i2\pi(u*(N-1)+v*(N-1))/N}\end{aligned}$$

Fig.29

$F_{new}(u,v) = F_{old}(u,v) - f_{old}(x_i, y_i) e^{-i2\pi(u*x_i + v*y_i)/N} + f_{new}(x_i, y_i) e^{-i2\pi(u*x_i + v*y_i)/N}$ $F_{new}(u,v) = F_{old}(u,v) + \Delta f(x_i, y_i) e^{-i2\pi(u*x_i + v*y_i)/N}$ WHERE, $\Delta f(x_i, y_i) = f_{new}(x_i, y_i) - f_{old}(x_i, y_i)$

Fig.30

$F_{new}(u,v) = F_{old}(u,v) + e^{-i2\pi(u*x_i + v*y_i)/N}$   $u,v = 0,1,2,...,N-1$

Fig.31

$VTF(u,v) F_{new}(u,v) = VTF(u,v) F_{old}(u,v) + VTF(u,v) e^{-i2\pi(u*x_i + v*y_i)/N}$ $u,v = 0,1,2 \cdots, N-1$

FAST GENERATION OF DITHER MATRIX

BACKGROUND OF THE INVENTION

1. Field of the Invention

This invention relates to technology for printing an image by forming dots on a print medium.

2. Description of the Related Art

As output devices for images created using a computer or images shot using a digital camera or the like, printing devices that print images by forming dots on a print medium are widely used. These printing devices perform gradation expression using a halftone process because there are few dot tone values that can be formed for the input tone values. As one halftone process, an ordered dither method using a dither matrix is widely used. The ordered dither method has a big effect on the image quality according to the dither matrix contents, so for example as disclosed in JP-A-7-177351, JP-A-7-81190, and JP-A-10-329381, an attempt was made to optimize the dither matrix using an analysis method of simulated annealing or genetic algorithm using an evaluation function taking into consideration the human visual sense.

However, this optimization process requires a complex computational algorithm and an enormous computing process, so significant problems remain in terms of practicality for particularly complex optimization problems.

SUMMARY OF THE INVENTION

An advantage of some aspect of the present invention is to provide highly efficient computing process technology for generating a dither matrix.

The present invention provides a method of generating a dither matrix that stores each of a plurality of threshold values in each of elements for determining a status of dot formation of each print pixel of a print image to be produced on a printing medium by carrying out halftone processing on image data. The method includes: determining a second evaluation value for a second dot status based on a first evaluation value and an evaluation value change level, the first evaluation value being for a first dot status prior to determination of a storage element of a targeted threshold value among the plurality of threshold values, the second dot status hypothetically presuming that the storage element of the targeted threshold value has been determined, the evaluation value change level representing a level of variation of the evaluation value associated with change from the first dot status to the second dot status; determining a storing element that stores the targeted threshold value based on the determined second evaluation value; and repeating the determining the second evaluation value and the determining the storing element, for at least some of the plurality of threshold values.

In the method for generating a dither matrix according to the present invention, an element for storing a targeted threshold value is determined on the basis of an evaluation value that has been determined with reference to an evaluation value for the dot status prior to determination of the storage element of the targeted threshold value, and to the level of variation of the evaluation value associated with change from this dot on-off state to a hypothetical dot status when the storage element of the targeted threshold value has been determined. Thus, by effectively using evaluation values prior to determination of storage elements, it is possible to achieve a highly efficient computing process.

The dither matrix of the present invention is a broad concept that includes a conversion table (or correspondence table) used to generate a dither matrix in technology such as that disclosed, for example, in Japanese Unexamined Patent Application 2005-236768 and Japanese Unexamined Patent Application 2005-269527, which teach the use of intermediate data (count data) for the purpose of identifying dot on-off state. Such conversion tables may be generated not only directly from dither matrices generated by the generation method of the present invention, but in some instances may be subject to adjustments or improvements; such instances will also constitute use of a dither matrix generated by the generation method of the present invention.

The fast computing process method of the present invention can improve processing efficiency by several orders of magnitude as shall be discussed later, making it possible for the practitioner to carry out various complex optimization processes as taught in the embodiments of the invention, without the need for a large investment in computer equipment for the purpose of halftone processing technology. In other words, by means of a simple survey of the computer equipment for the purpose of halftone processing technology, it can easily be determined whether implementation of the present invention is necessary for new dither matrix development.

Furthermore, it is not always necessary for a dot changing from the first dot on-off state to the second dot on-off state to have a single location and number; it is possible to determine storage elements the assume additional formation or movement of a plurality of dots. As a specific example, where storage elements of threshold values are determined in sequence, in the event that storage elements of threshold values up through the sixth have been determined, and storage elements of the seventh and eighth threshold values are now being determined, evaluation values can be determined based on the dot on-off state in the event a dot was added to the storage element of seventh threshold value as well, versus the dot on-off state in the event that a dot was added respectively to the storage elements of the seventh and eighth threshold values, and a seventh storage element determined thereby; or the storage elements of the seventh and eighth threshold values may be determined simultaneously.

Note that the present invention can be realized with various aspects including a printing device, a dither matrix, a dither matrix generating device, a printing device or printing method using a dither matrix, or a printed matter generating method, or can be realized with various aspects such as a computer program for realizing the functions of these methods or devices on a computer, a recording medium on which that computer program is recorded, data signals containing that computer program and embodied within a carrier wave, and the like.

Also, for use of the dither matrix for the printing device, printing method, or printed matter generating method, by comparing the threshold value set in the dither matrix with the image data tone value for each pixel, a decision is made of whether or not dots are formed for each pixel, but, for example, it is also possible to make a decision on whether or not dots are formed by comparing the sum of the threshold value and the tone value with a fixed value. Furthermore, it is also possible to make a decision on whether or not dots are formed according to data generated in advance based on the threshold value and on the tone value without directly using the threshold value. The dither method of the present invention generally is acceptable as long as the judgment of whether or not to form dots is made according to the tone value of each pixel and on the threshold value set in the pixel position corresponding to the dither matrix.

BRIEF DESCRIPTION OF THE DRAWINGS

FIG. 9 shows an illustration depicting dots formed on each of eight pixels corresponding to elements that store threshold values associated with the first to eighth levels of tendency to dot formation in a dither matrix M.

FIG. 10 shows an illustration depicting a dot density matrix representing dot density quantitatively.

FIG. 11 shows an illustration depicting a low pass filter in the embodiment of the invention.

FIG. 12 shows an illustration of identical dot density matrices positioned in the surrounding area for the purpose of performing computations of the peripheral portions of the dot density matrices.

FIG. 13 shows an illustration depicting the result of low pass filter processing of a dot density matrix.

FIG. 14 shows an illustration showing an equation that defines RMS granularity used in the embodiment.

FIG. 15 shows an illustration showing an equation used for fast calculation of RMS granularity used in the embodiment.

FIG. 16 shows an illustration showing a matrix representing density value prior to formation of a new dot on the pixel corresponding to a targeted storage element Fp1, and RMS granularity prior to formation of this new dot.

FIG. 17 shows an illustration showing a matrix representing density value after formation of a new dot on the pixel corresponding to a targeted storage element Fp1, and RMS granularity after formation of this new dot.

FIG. 18 shows an illustration showing a matrix representing density value prior to formation of a new dot, where the targeted element is present in the peripheral portion of the dot density matrix.

FIG. 19 shows an illustration showing a matrix representing density value after formation of a new dot, where the targeted element is present in the peripheral portion of the dot density matrix.

FIG. 21 shows an illustration depicting a dither matrix M subjected to the grouping process of Embodiment 2 of the invention.

FIG. 22 shows an illustration depicting four divided matrices M0-M3 in Embodiment 2 of the invention.

FIG. 24 shows an illustration depicting a dot pattern exclusively of dots corresponding to pixels belonging to the divided matrix M0.

FIG. 25 shows an illustration depicting a dot density matrix relating to the divided matrix M0.

FIG. 26 shows an illustration depicting a matrix storing group evaluation values.

FIG. 27 shows an illustration depicting the general equation of a two-dimensional discrete Fourier transform, where an N×N element area has been assumed.

FIG. 28 shows an illustration depicting an equation expanded from the general equation of the two-dimensional discrete Fourier transform.

FIG. 29 shows an illustration depicting a computational equation for computation of Fnew (u, v), using Fold (u, v) on the assumption that a targeted element f (xi, yi) has changed from targeted element fold (xi, yi) to fnew (xi, yi).

FIG. 30 shows an illustration depicting a simplified computational equation for computation of Fnew (u, v), utilizing the fact that f (xi, yi) is "1."

FIG. 31 shows an illustration depicting a computational equation for performing integral computation in computation of a granularity evaluation value.

DESCRIPTION OF THE PREFERRED EMBODIMENT

In order to provide a clearer understanding of the operation and effects of the present invention, the preferred embodiment of the invention shall be described hereinbelow, in the following order.

A. Dither Matrix Optimization in the Embodiment of the Invention:

A-1. Optimization with Respect to Image Observation System (Visual System):

A-2. Optimization with Respect to Image Output System (Printing Method):

B. Method of Generating Dither Matrix in the Embodiment of the Invention:

B-1. Optimization with Respect to Image Observation System:

B-2. Optimization with Respect to Image Output System:

C. Modification Examples

Figure 1:
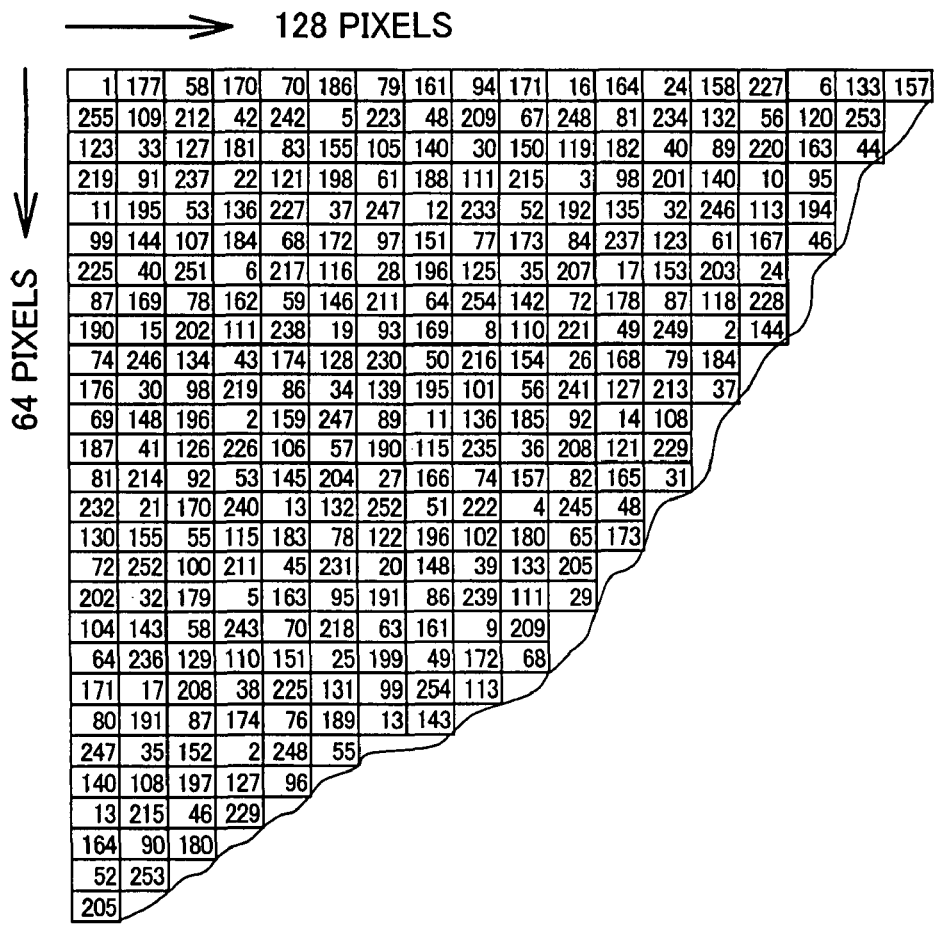
FIG. 1 shows an exemplary conceptual illustration of part of a dither matrix.

A. Dither Matrix Optimization in the Embodiment of the Invention:

FIG. 1 shows an exemplary conceptual illustration of part of a dither matrix. In the illustrated matrix, threshold values selected uniformly from a tone value range of 1-255 are stored in a total of 8192 elements, i.e. 128 elements in the lateral direction (main scanning direction) by 64 elements in the vertical direction (sub-scanning direction). The size of the dither matrix is not limited to that shown by way of example in FIG. 1, and it is possible to have various sizes, including a matrix with an equal number of storage elements in both the vertical and lateral directions.

Figure 2:
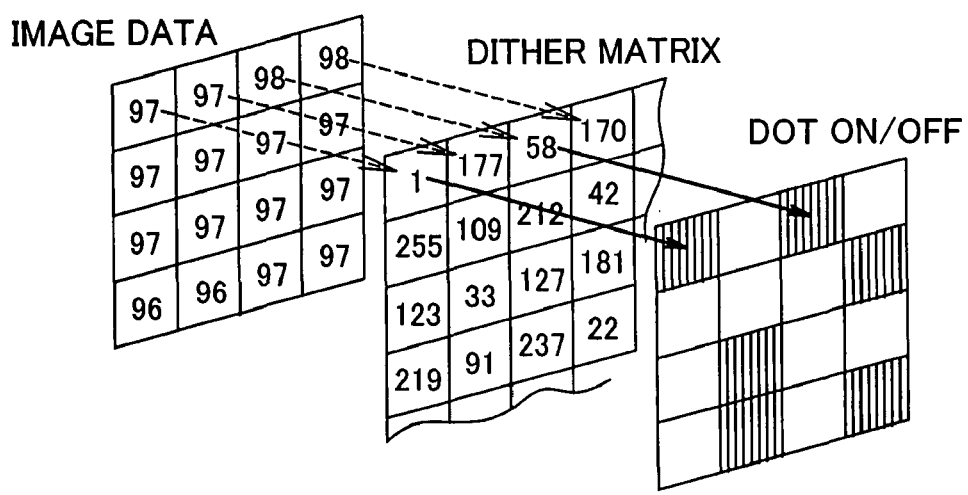
FIG. 2 shows an illustration depicting the concept of dot on-off state using a dither matrix.

FIG. 2 shows an illustration depicting the concept of dot on-off state using a dither matrix. For convenience, only some of the elements are shown. As depicted in FIG. 2, when determining dot on-off states, tone values from the image data are compared with threshold values saved at corresponding locations in the dither matrix. In the event that a tone value from the image data is greater than the corresponding threshold value stored in the dither table, a dot is formed; whereas if the tone value from the image data is smaller, no dot is formed. Pixels shown with hatching in FIG. 2 signify pixels on which dots are formed. By using a dither matrix in this way, the dot on-off state can be determined on a pixel-by-pixel basis, by a simple process of comparing the tone values of the image data with the threshold values established in the dither matrix, making it possible to carry out the tone number conversion process rapidly. Furthermore, as will be apparent from the fact that once the tone values of the image data have been determined the decision as to whether to form dots on pixels will be made exclusively on the basis of the threshold values established in the matrix, and thus with a systematic dither process, it will be possible to actively control dot production conditions by means of the threshold value storage locations established in the dither matrix.

Since with a systematic dither process it is possible in this way to actively control dot production conditions by means of the threshold value storage locations established in the dither matrix, a resultant feature is that dot dispersion and other picture qualities can be controlled by means of adjusting setting of the threshold value storage locations. This means that by means of a dither matrix optimization process it is possible to optimize the halftoning process with respect to a wide variety of target states.

Figure 3:
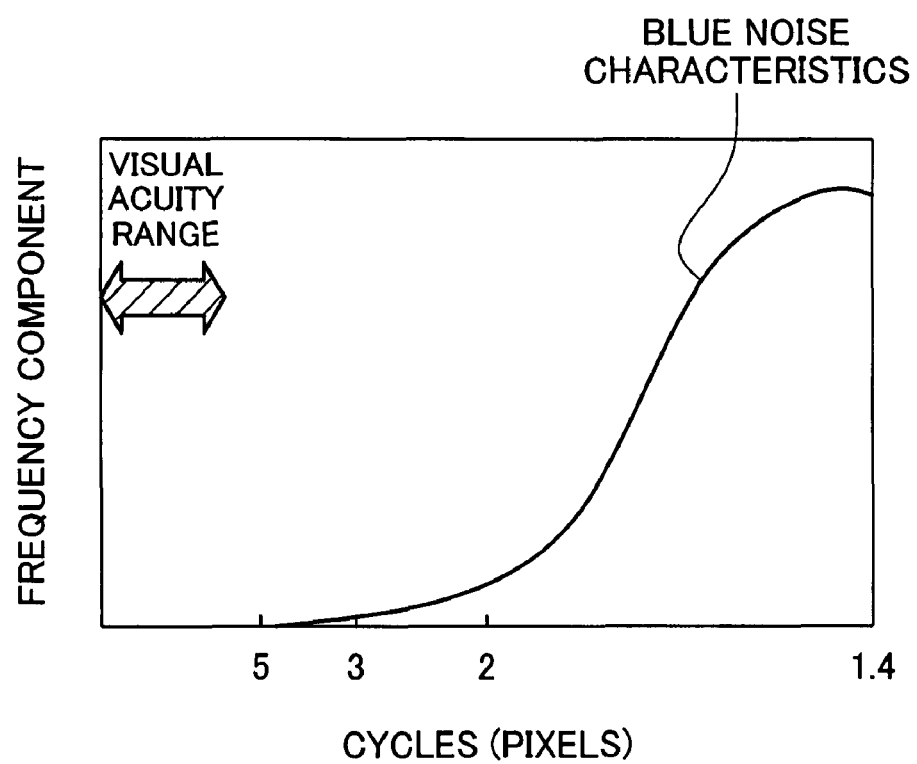
FIG. 3 shows an exemplary conceptual illustration of spatial frequency characteristics of threshold values established at pixels of a blue noise dither matrix having blue noise characteristics.

A-1. Optimization with Respect to Image Observation System (Visual System):

FIG. 3 shows an exemplary conceptual illustration of spatial frequency characteristics of threshold values established at pixels of a blue noise dither matrix having blue noise characteristics, by way of a simple example of dither matrix adjustment. The spatial frequency characteristics of a blue noise dither matrix are characteristics such that the length of one cycle has the largest frequency component in a high frequency region of 2 pixels or less. These spatial frequency characteristics have been established in consideration human perceptual characteristics. Specifically, a blue noise dither matrix is a dither matrix that, in consideration of the fact that human visual acuity is low in the high frequency region, has the storage locations of threshold values adjusted in such a way that the largest frequency component is produced in the high frequency region.

Figures 4A, 4B, 4C:
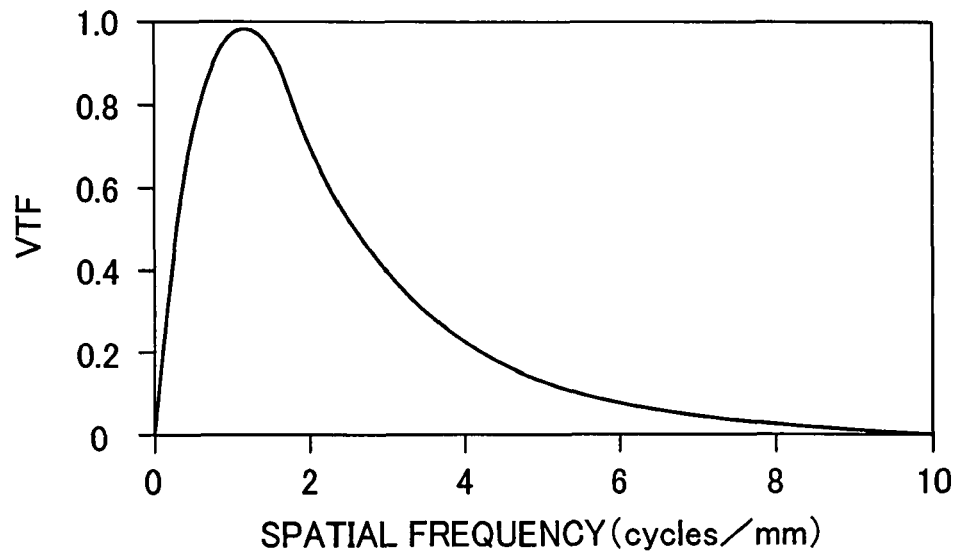
FIGS. 4(*a*) to 4(*c*) show a conceptual illustration of a visual spatial frequency characteristics VTF (Visual Transfer Function) representing human visual acuity with respect to spatial frequency.

FIGS. 4(a) to 4(c) show a conceptual illustration of a visual spatial frequency characteristics VTF (Visual Transfer Function) representing human visual acuity with respect to spatial frequency. Where a visual spatial frequency characteristics VTF is used, it is possible to quantify the perception of graininess of dots which will be apparent to the human visual faculty following a halftoning process, by means of modeling human visual acuity using a transfer function known as a visual spatial frequency characteristics VTF. A value quantified in this manner is referred to as a graininess index. FIG. 4(b) gives a typical experimental equation representing a visual spatial frequency characteristics VTF. In FIG. 4(b) the variable L represents observation distance, and the variable u represents spatial frequency. FIG. 4(c) gives an equation defining a graininess index. In FIG. 4(c) the coefficient K is a coefficient for matching derived values with human acuity.

Such quantification of graininess perception of the human visual faculty makes possible finely-tuned optimization of a dither matrix for the human visual system. Specifically, a Fourier transformation can be performed on a hypothetical matrix derived when input tone values have been input to a dither matrix, to arrive at a power spectrum FS, and a graininess evaluation value that can be derived by integrating all input tone values after a filter process involving multiplying the visual spatial frequency characteristics VTF with this power spectrum FS (FIG. 4(c)) can be utilized as a dither matrix evaluation coefficient. In this example, the aim is to achieve optimization where threshold value storage locations are adjusted so as to minimize the dither matrix evaluation coefficient.

As an example of an evaluation value of this type, an evaluation value called the GS value (Graininess scale) has been proposed. (Citation: Fine Imaging and Hardcopy, Corona, a co-publication of the editors of the Society of Photographic Science and Technology, Japan/The Imaging Society of Japan, p. 534). However, this model of the human visual system is not complete; as pointed out in Patent Citation 1 (Japanese Unexamined Patent Application 7-177351), graininess perception can vary depending on visual distance and other visual field parameters. Another evaluation scale is RMS granularity. RMS granularity shall be discussed in more detail later. In this way, there is room for further development in optimization for the visual system.

However, with this sort of nonlinear optimization, repeated trial and error is unavoidable in the optimization process, and considering the degree of freedom possible for threshold value storage location in a dither matrix containing, for example, threshold values of a tone value range of 1-255 at a total of 8192, it will be apparent that the number of repeated calculations required will be enormous.

In this way, while dither matrix optimization has the feature that it is possible to actively control the condition of dot production by means of the established threshold value storage locations, the enormous volume of optimization computations required makes it very impractical.

Figure 5:
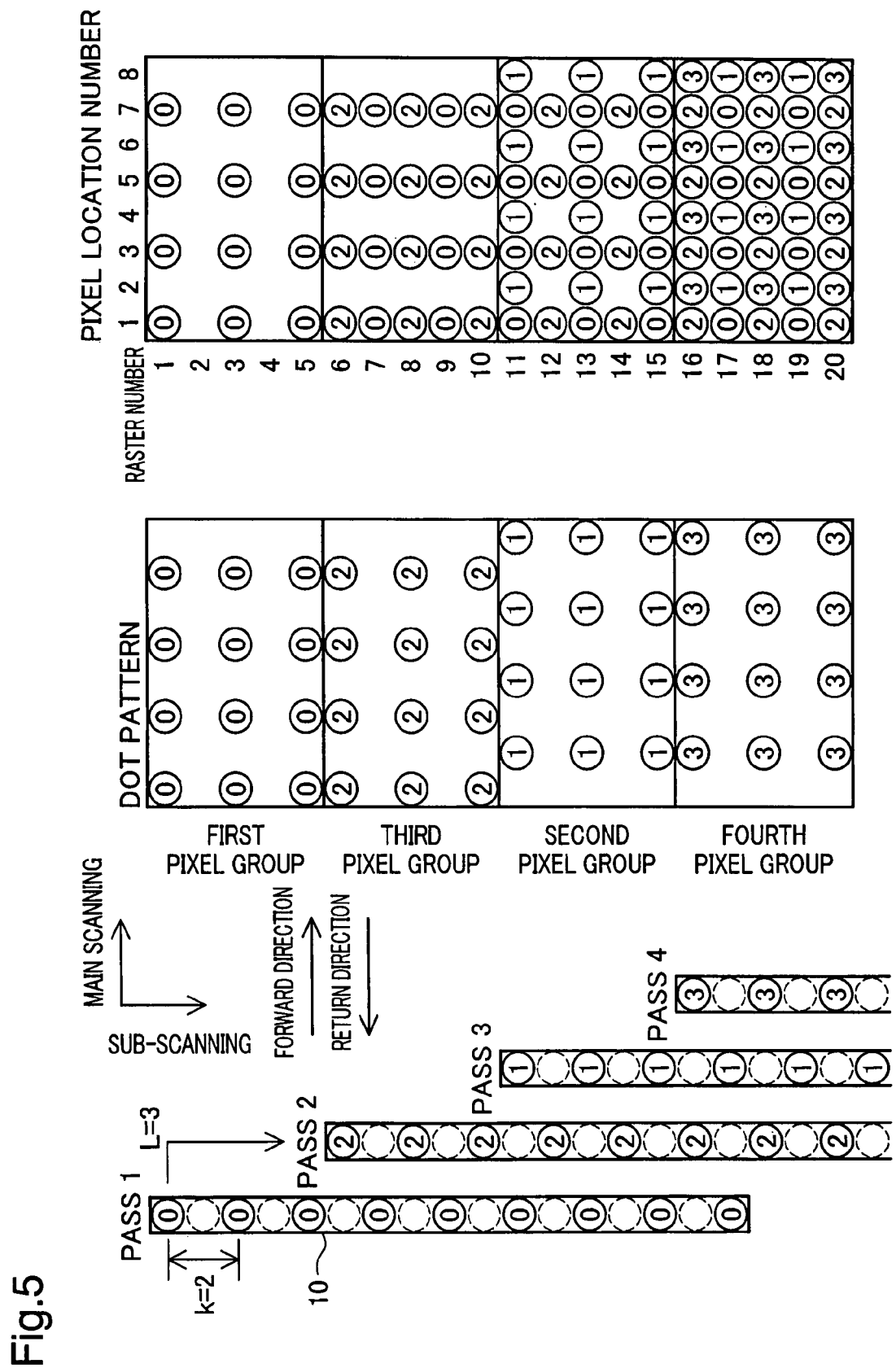
FIG. 5 shows an illustration depicting an exemplary method of generating an image for printing, targeted for dither matrix optimization in the embodiment of the invention.

A-2. Optimization with Respect to Image Output System (Printing Method):

FIG. 5 is an illustration depicting an exemplary method of generating an image for printing, targeted for dither matrix optimization in the embodiment of the invention. The inventors have made the novel discovery that that dither matrix optimization problem is effective not only for optimization with respect to the human visual system, but also for optimization with respect to image forming methods.

The print image is generated on the print medium by forming ink dots while performing main scanning and sub scanning in this image forming methods. The main scan means the operation of moving the printing head 10 relatively in the main scan direction in relation to the print medium. The sub scan means the operation of moving the printing head 10 relatively in the sub scan direction in relation to the print medium. The printing head 10 is configured so as to form ink dots by spraying ink drops on the print medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups configured from the plurality of pixels for which ink dots are formed simultaneously. With pass 1, dots are formed on the print pixels belong to the first pixel group.

When the pass 1 main scan is completed, the sub scan sending is performed at a movement volume L of 3 times the pixel pitch in the sub scan direction. Typically, the sub scan sending is performed by moving the print medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the second pixel group. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the third and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 8. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the second pixel group. With pass 3, at the focus area, dots are formed at the pixels belonging to the third pixel group. With pass 4, at the focus area, dots are formed at the pixels belonging to the fourth pixel group.

In this way, with this embodiment, we can see that the dots formed at the print pixels belonging to each of the plurality of first to fourth pixel groups are formed by mutually combining at the common print area.

Figure 6:
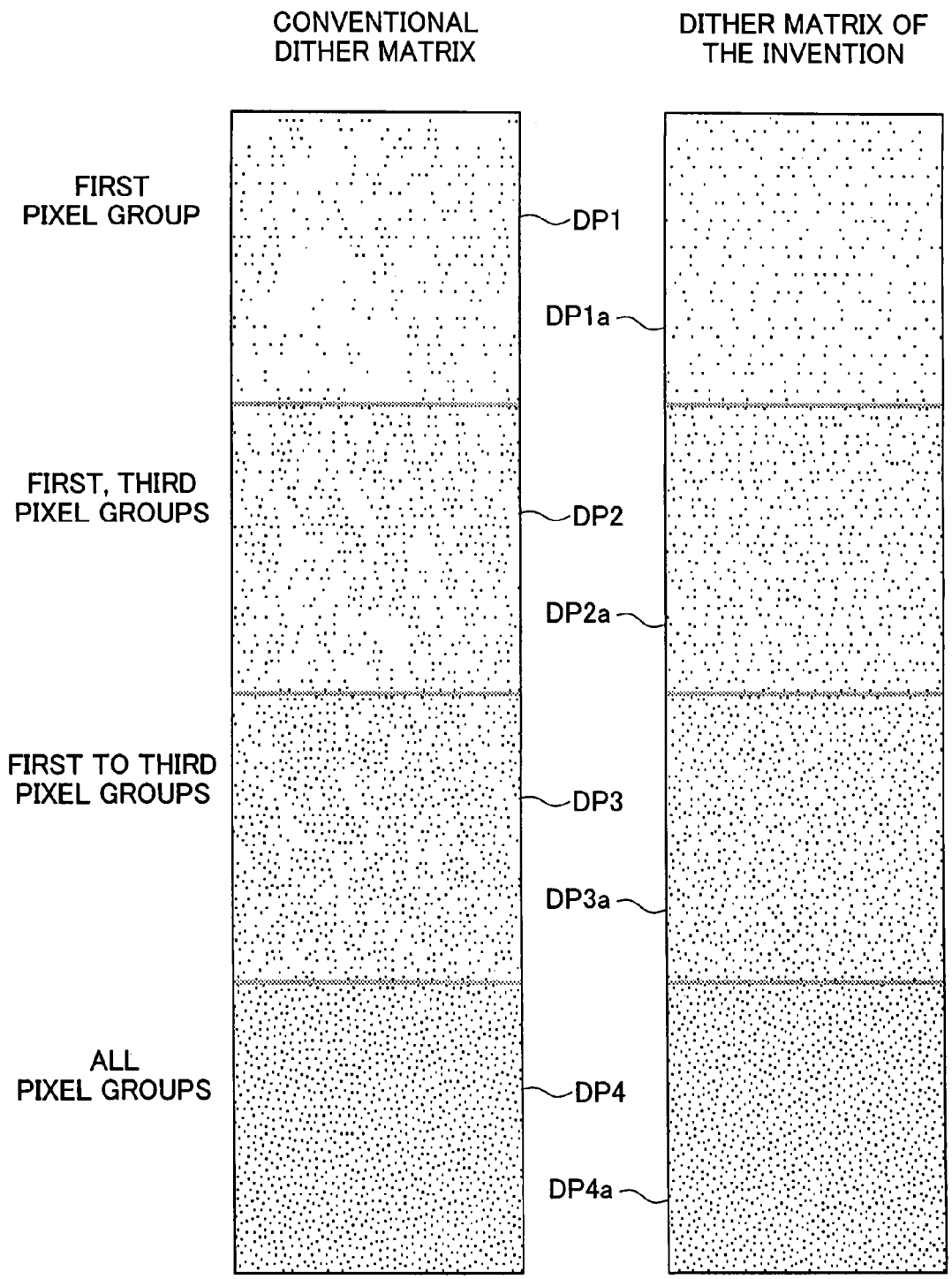
FIG. 6 shows an illustration depicting print pixels belonging to each of a plurality of pixel groups, being combined with one another in a common printing area to generate a print image on a printing medium in the embodiment of the invention.

FIG. 6 is an explanatory drawing showing the state of generating a print image on a print medium by mutually combining on a common print area the dots formed on the print pixels belonging to each of the plurality of pixel groups for the first embodiment of the present invention. With the example of FIG. 2, the print image is the print image of a specified medium gradation (single color). The dot patterns DP1 and DP1a indicate dot patterns formed at a plurality of pixels belonging to the first image group. The dot patterns DP2 and DP2a indicate dot patterns formed on the plurality of pixels belonging to the first and third pixel groups. The dot patterns DP3 and DP3a indicate dot patterns formed on the plurality of pixels belonging to the first to third pixel groups. The dot patterns DP4 and DP4a indicate dot patterns formed on the plurality of pixels belonging to all the pixel groups.

The dot patterns DP1, DP2, DP3, and DP4 are dot patterns when using the dither matrix of the prior art. The dot patterns DP1a, DP2a, DP3a, and DP4a are dot patterns when using the dither matrix of the invention of this application. As can be understood from FIG. 6, when using the dither matrix of the invention of this application, especially with the dot patterns DP1a and DP2a for which there is little dot pattern overlap, the dot dispersibility is more uniform than when using the dither matrix of the prior art.

With the dither matrix of the prior art, optimization is performed focusing only on the dot dispersibility for the finally formed print image (with the example in FIG. 6, dot pattern DP4) because there is no concept of a pixel group. To say this another way, because the dispersibility of dots formed on the pixels belonging to each pixel group is not considered, the dispersibility of dots formed on the pixels belonging to each pixel group is poor, and dot density sparseness occurs.

The dither matrix of the invention of this application, in addition to the dispersibility of the dots for the print image, also considers up to the dispersibility of the dots formed on the pixels belonging to each pixel group, so the dispersibility of the dots formed on the pixels belonging to each pixel group and the dispersibility of dots for the print image are both improved.

The dither matrix of the invention of this application attempts to optimize not only the finally formed dot patterns, but also focuses on dot patterns with the dot forming process. This kind of focus point did not exist in the past. This is because in the past, the technical basic assumption was that even if the dot pattern dispersion was poor with the dot forming process, the image quality was good if the dispersibility of the dot patterns formed at the end were good.

However, the inventors of this application went ahead and performed an analysis of the image quality of print images focusing on the dot patterns with the dot forming process. As a result of this analysis, it was found that image unevenness occurs due to dot pattern sparseness with the dot forming process. This image unevenness was ascertained by the inventors of this application to be strongly perceived by the human eye as ink physical phenomena such as ink agglomeration unevenness, glossiness, or the bronzing phenomenon. Note that the bronzing phenomenon is a phenomenon by which the status of the light reflected by the printing paper surface is changed, such as the printing surface exhibiting a color of a bronze color or the like due to ink drop pigment agglomeration or the like.

For example, the ink agglomeration or bronzing phenomenon can occur even in cases when a print image is formed with one pass. However, even when ink agglomeration or the like occurs uniformly on the entire surface of the print image, it is difficult to be seen by the human eye. This is because since it occurs uniformly, ink agglomeration or the like does not occur as non-uniform "unevenness" including low frequency components.

However, when unevenness occurs with low frequency areas which are easily recognized by the human eye with ink agglomeration or the like for dot patterns formed in pixel groups for which ink dots are formed almost simultaneously with the same main scan, this is manifested as a strong image quality degradation. In this way, when forming print images using ink dot formation, it was first found by the inventors that optimization of the dither matrix focusing also on dot patterns formed in pixel groups for which ink dots are formed almost simultaneously is linked to higher image quality.

In addition, with the dither matrix of the prior art, optimization was attempted with the prerequisite that the mutual positional relationship of each pixel group is as presupposed, so optimality is not guaranteed when the mutual positional relationship is skewed, and this was a cause of marked degradation of the image quality. However, dot dispersibility is ensured even with dot patterns for each pixel group for which mutual positional relationship skew is assumed, so it was first confirmed by experiments of the inventors of the invention of this application that it is possible to also ensure a high robustness level in relation to mutual positional relationship skew.

Furthermore, for the technical concept of the invention of this application, it was also ascertained by the inventors that the importance increases as the printing speed accelerates. This is because acceleration of the printing speed is connected to the formation of dots in the next pixel group during the time that sufficient time has not been taken for ink absorption.

In this way, the inventors developed a novel dither matrix optimization method, taking note of the dot formation process, and the configuration of the printing device, namely, the printing process. However, such an optimization problem created the need to speed up dither matrix evaluation computations and dramatically reduce the computing process load. This is because the dot formation process, and the configuration of the printing device, namely, the printing process, have many parameters and variations, so that the amount of computations required for optimization is huge. As shall be discussed hereinbelow, the present invention makes it possible to dramatically reduce this huge amount of computations.

B. Method of Generating Dither Matrix in the Embodiment of the Invention:

The embodiment of the present invention affords an optimal dither matrix for an image observation system, and an optimal dither matrix generating method for an image forming device. However, it is possible to combine the two, as well as to carry out optimization through adjustment of a dither matrix by switching threshold value storage locations of the dither matrix, as shall be described later in a modification example. Dither matrix optimization can also be performed on a partial basis, i.e. by optimization for a portion of the input tone values (e.g. only for areas with low dot density), or for a partial element region (e.g. only the center portion or peripheral portion of a dither matrix).

Figure 7:
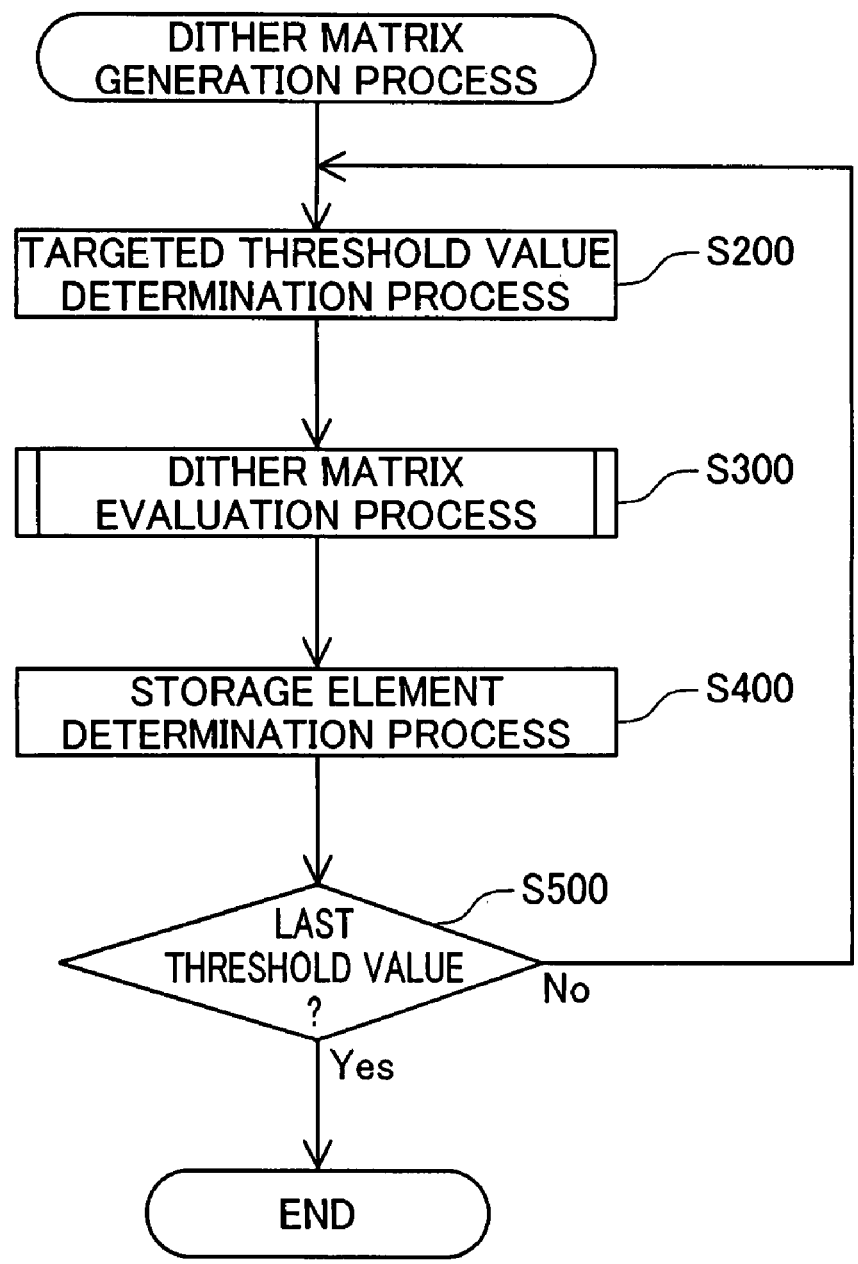
FIG. 7 shows a flowchart showing the processing routine of the dither matrix generation method in Embodiment 1 of the invention.

B-1. Optimization with Respect to Image Observation System:

FIG. 7 shows a flowchart showing the processing routine of the dither matrix generation method in Embodiment 1 of the invention. In this example, to facilitate description, generation of a small 8×8 matrix shall be described. Optimization is assumed to be carried out based on the RMS granularity newly discovered by the inventors.

In Step S200, a targeted threshold value determination process is carried out. The targeted threshold value determination process is a process for determining a threshold value targeted for determination of a storage element. In the embodiment, threshold values are determined by selecting threshold values of relatively small value, i.e. in sequence starting from threshold values associated with tendency to dot formation. Through selection in sequence starting from threshold values associated with tendency to dot formation in this way, elements for storage are fixed in sequence starting from threshold values that control dot placement in highlight areas where dot granularity tends to stand out, so that there is a large degree of freedom in design of highlight areas where dot granularity tends to stand out.

In Step S300, a dither matrix evaluation process is carried out. The dither matrix evaluation process is a process for numerical conversion of dither matrix optimality on the basis of a pre-established evaluation coefficient. In the embodiment, as noted, the evaluation coefficient is RMS granularity. Specifically, an evaluation value that represents dot dispersion in the low frequency region of relatively high visual acuity serves as the basis for evaluation of the dither matrix.

Figure 8:
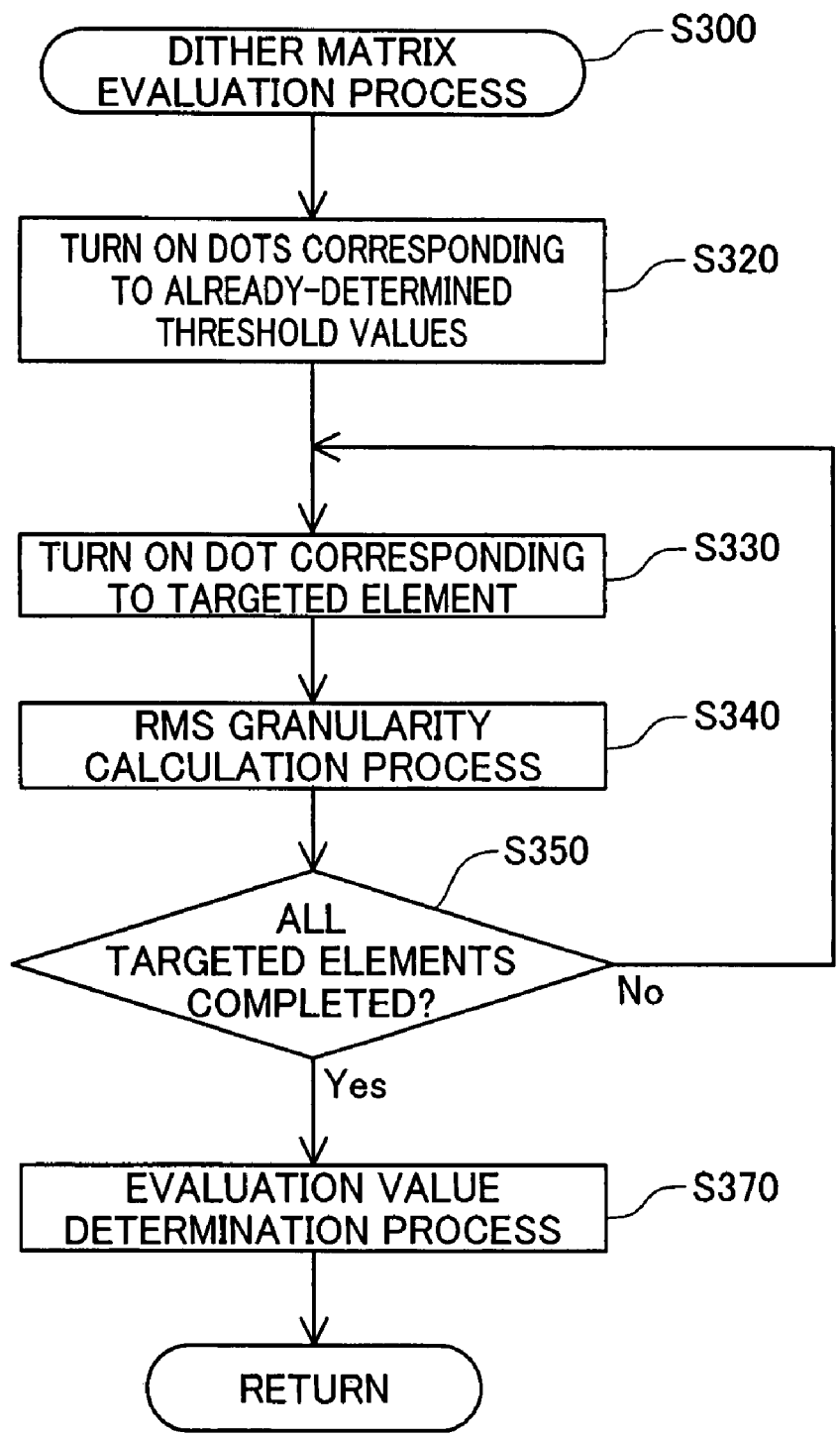
FIG. 8 shows a flowchart showing the processing routine of the dither matrix evaluation process in Embodiment 1 of the invention.

FIG. 8 shows a flowchart showing the processing routine of the dither matrix evaluation process in Embodiment 1 of the invention. In the dither matrix evaluation process of this embodiment, first, considering that dots have been formed on pixels corresponding to already-determined elements (these are elements for which threshold values for storage have already been determined), and on the assumption that a dot has been formed on any empty element (this is an element for which a threshold value for storage has not yet been determined), RMS granularity is determined as an evaluation value for each empty element. Next, a storage element is determined on the basis of the calculated RMS granularity. Specifically, the process is carried out as follows.

In Step S320, the corresponding dots of already-determined threshold values are turned ON. An already-determined threshold value means a threshold value for which a storage element has already been determined. In the embodiment, as noted, since selection takes place in sequence starting from threshold values associated with tendency to dot formation, when a dot is formed on a targeted threshold value, dots will invariably have been formed on pixels corresponding to elements where already-determined threshold values are stored. Conversely, at the smallest input tone value at which a dot will form at the targeted threshold value, dots will not have been formed on any pixels corresponding to elements other than an element where an already-determined threshold value is stored.

FIG. 9 shows an illustration depicting dots formed on each of eight pixels corresponding to elements that store threshold values associated with the first to eighth levels of tendency to dot formation in a dither matrix M. This dot pattern is used to determine on which pixel the ninth dot should be formed. Specifically, it is used to determine the storage element for the threshold value of note with the ninth level of tendency to dot formation. In the embodiment, determination of the storage elements is carried out in such a way that the targeted threshold value is stored in an element corresponding to the pixel affording the lowest RMS granularity for hypothetical dot on/off status when assumed that a dot was formed. This is because the on/off status of dots formed on pixels corresponding to each element of the matrix serves as the criterion for evaluating whether dot dispersion is high in the low frequency region of relatively high visual acuity.

FIG. 10 shows an illustration depicting a matrix in which the condition of a dot having been formed on each of the eight pixels in FIG. 9 is quantified, i.e., a dot density matrix that represents dot density quantitatively. The numeral 0 signifies that no dot has been formed, and the numeral 1 signifies that a dot has been formed.

In Step S340, an RMS granularity calculation process is carried out. The RMS granularity calculation process is a process for calculating standard deviation, after low pass filter processing of a dot density matrix. Calculation of standard deviation can be carried out using the computational equation discussed later. This process is carried out on the assumption that dots have been turned ON (Step S330) for all pixels of note (Step S350).

The low pass filter process is a process for extracting the low frequency component of the dot density matrix mentioned above. The reason for extracting the low frequency component in calculation of RMS granularity is for the purpose of optimizing the dither matrix in consideration of the relatively high human visual acuity in the low frequency range.

The low pass filter applied here can be one that simply substitutes a digital process for an optical low pass filter process accomplished, for example, by passage through an aperture of given planar area. It is possible for such a low pass filter to be constituted as a simple filter with weighting factor that is a definite number (e.g. 1). This kind of optical low pass filter process has been carried out in the past in the field of photographic film, where RMS granularity was used as a typical evaluation criteria. In the embodiment, the following filter, which has some additional improvements, is used.

FIG. 11 is an illustration depicting a low pass filter in the embodiment of the invention. In the embodiment, since the filter-processed results are used on for comparing the magnitude of dot density, normalization of the low pass filter is not performed. As shown in FIG. 12, in the filter process, identical dot density matrices are positioned in the surrounding area for use in computation of the peripheral portions of the dot density matrices.

It is possible for the low pass filter to be designed freely as a low pass filter reflecting VFT characteristics or other desired frequency characteristics. The design of the low pass filter can, for example, define appropriate filter characteristics in a two-dimensional frequency space, and be carried out in conformity with the result of inverse Fourier transformation thereof. The frequency characteristics of a low pass filter designed in this manner can be checked easily by Fourier transformation. In this ways, in the embodiment, it is possible to perform optimization with extremely good prospects, on the basis of characteristics in a two-dimensional frequency space tied directly to human visual perception.

FIG. 13 shows an illustration depicting the result of low pass filter processing of a dot density matrix. The numeral in each element represents a density value. A density value signifies a dot density value of pixels corresponding to each element in the dither matrix M having storage elements determined for eight threshold values, on the assumption that dots have been formed on pixels corresponding to the elements where the eight determined threshold values were stored. Larger numerals indicate higher dot density, while smaller numerals indicate lower dot density, i.e. sparsely formed dots.

FIG. 14 shows an illustration showing an equation that defines RMS granularity used in the embodiment. RMS granularity is defined as the standard deviation of density values calculated by the method described above. The standard deviation of density values is an objective statistical quantity representing variability of density values, and thus RMS granularity can be understood to be an evaluation value that can objectively represent whether dots are dispersed uniformly as described above, i.e. dispersion of dot density.

FIG. 15 shows an illustration showing an equation used for fast calculation of RMS granularity used in the embodiment. This equation is a mathematically equivalent equation derived by transformation of FIG. 14. However, the equation of FIG. 15, by eliminating the "subtraction process by average value of density values," makes possible a fast calculation process, to be described later.

FIGS. 16 to 19 are illustrations depicting two examples of computation of RMS granularity in the embodiment. FIGS. 16 and 17 depict two matrices representing density values before and after new dots are formed on pixels corresponding to 5×5 targeted storage elements Fp1, and RMS granularity before and after these new dots are formed. FIGS. 18 and 19 depict two matrices representing density values before and after a new dot is formed on pixels corresponding to a 1×1 targeted storage element Fp2, and RMS granularity before and after this new dot is formed.

The example of FIG. 16, that is, the calculation of RMS granularity before formation of the new dots, is performed as follows, using the definition equation (FIG. 14).

(1) An average density value is calculated by dividing the sum of density of each pixel by pixel count of 64.

(2) The square of the difference between the average density value and the density values of each pixel is calculated for all pixels, to derive a sum $\Sigma$ of calculated values of all pixels.

(3) The sum $\Sigma$ of calculated values of all pixels is divided by the pixel count of 64 and the square root is taken.

In this way, in this example, RMS granularity of 1.54 can be calculated.

In the example of FIG. 17, that is, the calculation of RMS granularity before formation of the new dots, where the definition equation of FIG. 14 is used, calculation will be performed by the same method as above after performing addition of dot density values caused by formation of new dots. This addition of dot density values can be carried out by adding each element value of the low pass filter (FIG. 11), centering on the targeted storage element Fp1. The element range Fr1 indicates the range in which dot density values were added. Computation by the above method on the basis of density values calculated in this way yields RMS granularity of 1.55.

Where on the other hand calculations for the example of FIG. 17 are performed using the fast computational equation (FIG. 15), the computation can be simplified utilizing the RMS granularity prior to formation of new dots (FIG. 16). The reason is that the fast computational equation (FIG. 15), which is mathematically equivalent to the definition equation (FIG. 14), is composed of the square root of a first term (the sum of squared density values/pixel count) and a second term (the square of the sum of density values/pixel count), and does not include a subtraction process by the average value of the density values.

Since the first term is composed of the sum of squared density values/pixel count, it will be apparent that even if the dot density of the filter Fr1 (FIG. 17), whose dot density is affected by the additional formed dots, should vary, computations for pixels outside the filter Fr1 will be unaffected. With the definition equation (FIG. 14), on the other hand, since the average value of the density values will vary, computations outside the filter Fr1 will be affected as well. Thus, it will be apparent that with the fast computational equation (FIG. 15), by performing computations for the filter range Fr1 only, the level of variation of RMS granularity due to formation of new dots can be calculated.

Since the second term is composed of the square of the sum of density values/pixel count, calculations can be performed in a simple manner without computation on a pixel-by-pixel basis, merely by adding the sum of element values of the low pass filter (FIG. 11) to the sum of the dot density values prior to new dot formation (FIG. 16) and squaring this sum; subtracting the square of the sum of dot density values prior to new dot formation (FIG. 16) from the value so calculated; and finally dividing by the pixel count.

Thus, through the use of the fast computational equation (FIG. 15), since there is no need to once again perform computation for pixels lying outside the filter Fr1 (FIG. 17) whose dot density is affected by the additional formed dots, it is possible thereby to reduce the volume of computational processing. In the embodiment, a hypothetical 8×8 dither matrix is presented for the purpose of aiding understanding; however, it will be apparent that for a typical dither matrix with an element count of 8192 (128×64 elements), since the level of variation in RMS granularity can be calculated simply for the pixel count of 9 to 25 for a typical low pass filter, the volume of computations can be reduced dramatically.

FIG. 18 and FIG. 19 depict an example in which a targeted storage element Fp2 is present in the peripheral portion of the dot density matrix, and the filter range runs off to the outside of the dither matrix. In this example, as discussed previously, in the filter process identical dot density matrices are positioned in the surrounding area and used for performing computations of the peripheral portions of the dot density matrices (FIG. 12). Specifically, it is possible to implement this by setting the filter range to a filter range Fr2a, a filter range Fr2b, a filter range Fr2c, or a filter range Fr2d.

In Step S370, an evaluation value determination process is carried out. In the embodiment, RMS granularity is used as-is for the evaluation value.

In Step S400 (FIG. 20), a storage element determination process is carried out. The storage element determination process is a process for determining a storage element for a targeted threshold value (in this example, the threshold value with the eighth level of tendency to dot formation). In the embodiment, storage elements are determined from among elements with the smallest evaluation values.

Once this process has been carried out for all threshold values from the threshold value with the greatest tendency to dot formation to the threshold value with the least tendency to dot formation, the dither matrix generation process is complete (Step S500).

Thus, in the embodiment of the present invention, since evaluation values can be calculated easily, simply by performing computations for a plurality of elements belonging to a range whose dot density is affected by the additional formed dots by means of a low pass filter process, the volume of computations can be reduced dramatically. Moreover, since computations are carried out while selecting targeted threshold values in sequence from relatively small site locations, it suffices to compute evaluation values in sequence by the same procedure of calculating the level in variation of evaluation values for each individual input tone value, and thus optimization may be accomplished with very high process efficiency.

Figure 20:
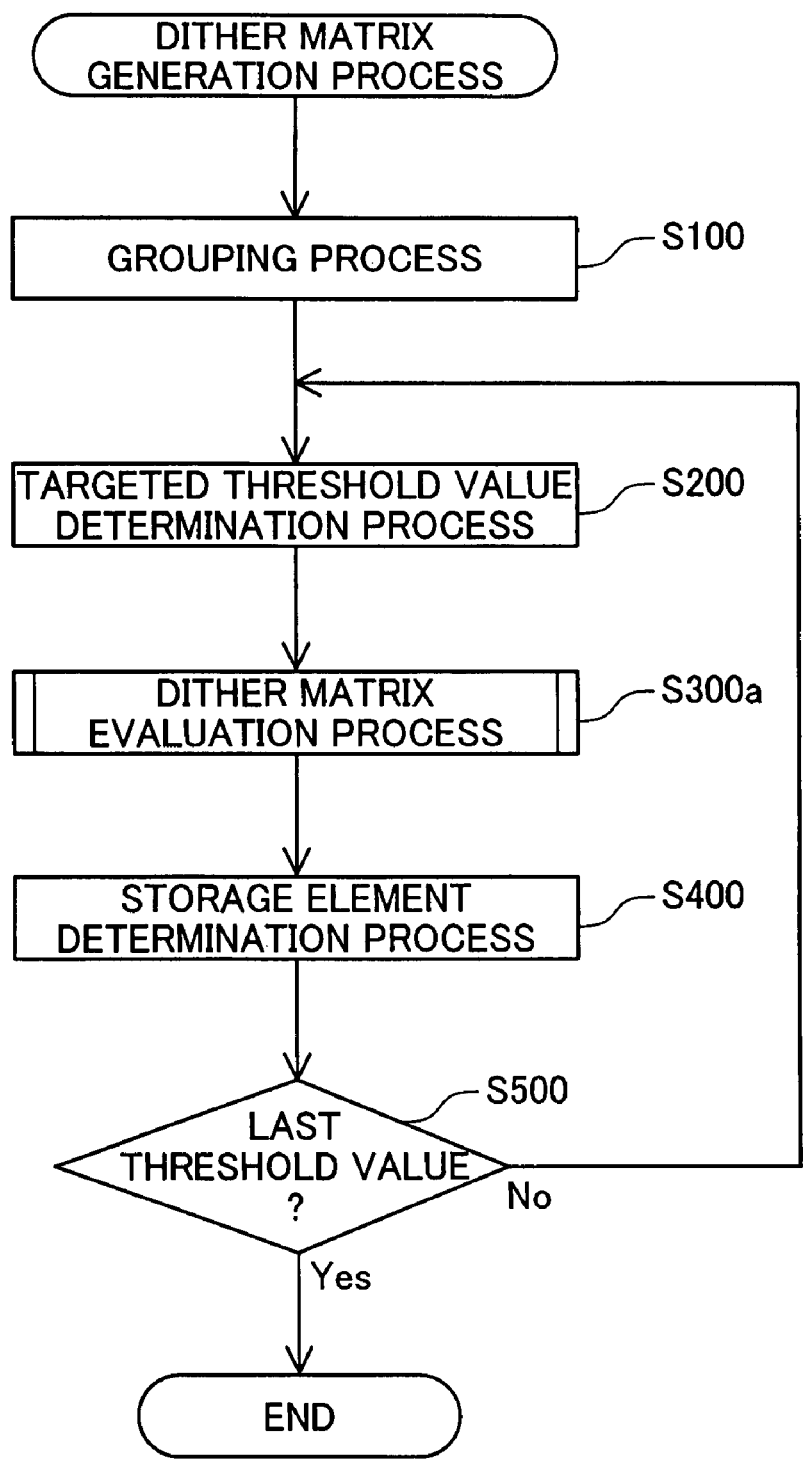
FIG. 20 shows a flowchart showing the processing routine of the dither matrix generation method in Embodiment 2 of the invention.

B-2. Optimization with Respect to Image Output System:

FIG. 20 is a flowchart showing the processing routine of the dither matrix generation method in Embodiment 2 of the invention. This dither matrix generation method is designed with the aim of optimization in consideration of dispersion of dots formed substantially simultaneously in a print image forming process. Thus, a Step S100 has been added, and Step S300 has been modified to Step S300a.

In Step S100, a grouping process is carried out. In the embodiment, the grouping process is a process for dividing a dither matrix by individual elements corresponding to a plurality of pixel groups in which dots are formed substantially simultaneously in the print image forming process.

FIG. 21 is an illustration depicting a dither matrix M subjected to the grouping process of the embodiment of the invention. In this grouping process, the dither matrix is assumed to be divided into the four pixel groups in FIG. 5. The numeral appearing in each element of the dither matrix M indicates the pixel group to which the element belongs. For example, the element of row 1, column 1 belongs to the first pixel group (FIG. 5), and the pixel of row 1, column 2 belongs to the second pixel group.

FIG. 22 is an illustration depicting four divided matrices M0-M3 in Embodiment 2 of the invention. The divided matrix M0 is composed of a plurality of elements corresponding to pixels belonging to the first pixel group among the pixels of the dither matrix M, and blank elements representing a plurality of elements that are blank. The dither matrices M1-M3 are respectively composed of pixels belonging to the second to fourth pixel groups among the pixels of the dither matrix M, and blank elements.

In Step S300a, a dither matrix evaluation process is carried out on the basis of RMS granularity in the same manner as in Embodiment 1. However, in this embodiment, evaluation is carried out in consideration not only of the dither matrix M, but of the four divided matrices M0-M3 as well.

Figure 23:
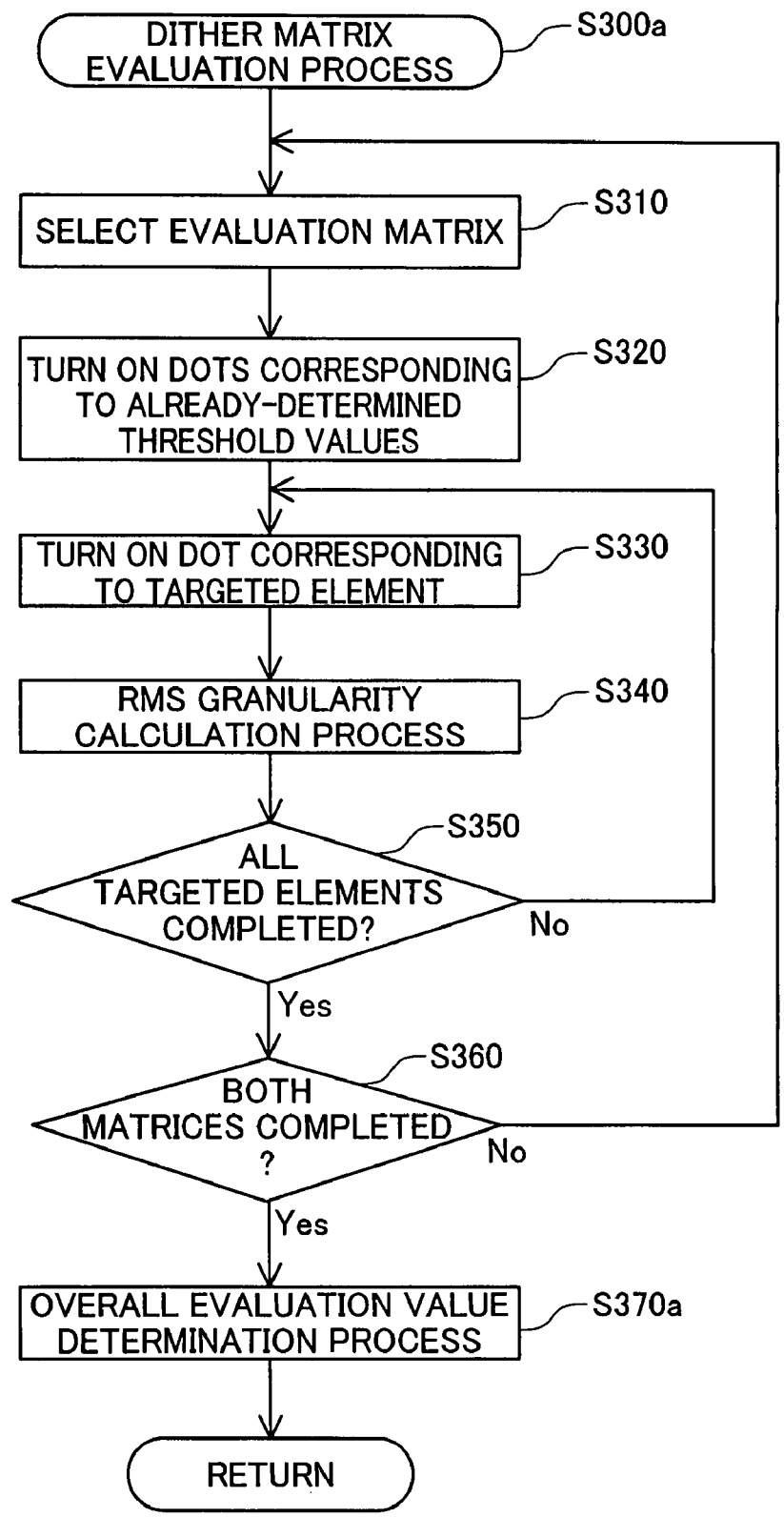
FIG. 23 shows a flowchart showing the processing routine of the dither matrix evaluation process in Embodiment 2 of the invention.

FIG. 23 is a flowchart showing the processing routine of the dither matrix evaluation process in the embodiment of the invention. However, in this embodiment, since evaluation is carried out in consideration of the four divided matrices M0-M3 as well, Step S310 and Step S360 have been added, and Step S370 has been modified to Step S370a.

In Step S310, an evaluation matrix is selected. In the embodiment, the evaluation matrix refers to a single matrix from among the four divided matrices M0-M3, which is targeted for evaluation during determination of storage elements for targeted threshold values. In the embodiment, the evaluation is carried out targeting the evaluation matrix and the dither matrix M. However, an arrangement whereby the evaluation is carried out targeting all five matrices would also be acceptable.

In the embodiment, the evaluation matrix is selected sequentially together with the targeted threshold value. Specifically, in the embodiment, divided evaluation matrices are selected in sequence, by a method of selecting the divided matrix M0 for the first targeted threshold value, and selecting the divided matrix M1 for the second targeted threshold value. The targeted threshold value is stored in any of the elements belonging to the valuation matrix.

FIG. 24 depicts a dot pattern exclusively of dots corresponding to pixels belonging to the divided matrix M0, extracted from the dot pattern of FIG. 9. FIG. 25 is an illustration depicting a dot density matrix relating to the divided matrix M0. When a low pass filter process is performed on this dot density matrix, a group density value (FIG. 26) is calculated. The group density value signifies the dot density value of the pixel corresponding to each element in the dither matrix M when two threshold value storage elements have been determined, on the assumption that dots have been formed on the pixels corresponding to the elements at which the two determined threshold values have been stored.

Group density values calculated in this way are used in calculating a total density value, as well as RMS granularity. The total density value is equivalent to the density value in Embodiment 1.

In Step S370a, an overall evaluation value determination process is carried out. In the overall evaluation value determination process, RMS granularity for a total density value, and RMS granularity for group density values, are weighted by prescribed factors and added, to determine an overall evaluation value. In the embodiment, by way of an example, weights of "4" and "1" have been assigned to RMS granularity for total density value and to RMS granularity for group density values, respectively.

In Step S400 (FIG. 20), a storage element determination process is carried out is the same manner as in Embodiment 1.

The storage element determination process is a process for determining a storage element for a targeted threshold value (in this example, the threshold value with the eighth level of tendency to dot formation). In the embodiment, storage elements are determined from among elements with the smallest overall evaluation values.

Once this process has been carried out in the same manner as in Embodiment 1 for all threshold values from the threshold value with the greatest tendency to dot formation to the threshold value with the least tendency to dot formation, the dither matrix generation process is complete (Step S500).

In Embodiment 2, since evaluation is carried out in this way in consideration of the four divided matrices M0-M3 as well, dither matrices optimized for an image formation process can be created with a very small volume of computation. In particular, the fact that this kind of optimization for an image formation process is implementable with a very small volume of computation is extremely important in consideration of the fact that image formation is carried out by a wide variety of methods.

C. Modification Examples

While certain preferred embodiments of the present invention have been shown hereinabove, the present invention is in no way limited to these particular embodiments, and may be reduced to practice in various other ways without departing from the scope thereof. For example, the present invention makes possible optimization of dither matrices for modification examples like the following.

C-1. In the preceding embodiments the criterion for evaluation was whether the plurality of dots formed on pixels corresponding to elements of the entire matrix are formed uniformly at each tone value; however, it would be acceptable to instead carry out evaluation on the basis of a plurality of dots formed on pixels corresponding to elements of an area that is only part of the matrix, instead of the entire matrix. In such a case, threshold values will not be consecutive but will instead skip (e.g. 12, 25, 45 . . . ); however, as with the embodiments discussed earlier, the present invention may be implemented by means of determining as the targeted threshold value a threshold value that, among the plurality of threshold values to be stored at elements belonging to the area in question, a threshold value for which the element for storage thereof is yet underdetermined, and which has the highest tendency for dot formation to turn ON.

C-2. In the preceding embodiments a low pass filter process was carried out and the optimality of a dither matrix was evaluated on the basis of uniformity of dot density and RMS granularity; however, another acceptable arrangement would be, for example, to carry out Fourier transformation on a dot pattern as well as evaluating the optimality of a dither matrix using a VTF function. Specifically, an acceptable arrangement would be to apply the evaluation metric used by Dooley et al. of Xerox (Graininess Scale: GS value) to a dot pattern, and evaluate the optimality of the dither matrix by means of the GS value. Here, the GS value is a graininess evaluation value that can be derived by numerical conversion of the dot pattern carried out by a prescribed process including two-dimensional Fourier transformation, as well as a filter process of multiplying by a visual spatial frequency characteristics VTF followed by integration.

The present invention is also applicable to instances where a graininess evaluation value is used for dither matrix evaluation. This is because the inventors have created a way to directly compute the level of variation of a graininess evaluation value depending on change in dot density, even for graininess evaluation values that can be derived by means of numerical conversion carried out by a prescribed process including two-dimensional Fourier transformation, as well as a filter process of multiplying by a visual spatial frequency characteristics VTF followed by integration. Specifically, the level of variation in an evaluation value can be calculated easily using the computational equation shown in FIG. 31, simply by calculating prescribed constants, creating a table, and multiply a prescribed constant read out from this table by a VTF function.

FIG. 31 is a computational equation for executing the integration process mentioned above. VTF $(u, v)$ is a visual spatial frequency characteristics VTF function. Fold $(u, v)$ is a value derived by numerical conversion carried out by a prescribed process including two-dimensional Fourier transformation, prior to change of dot density. Fnew $(u, v)$, in the past Note: preceding text inserted unintentionally?], is a value for numerical conversion by a prescribed process including two-dimensional Fourier transformation, after change of dot density. As will be apparent from the equation, the coefficient which is multiplied by VTF $(u, v)$ of the second term is not dependent on dot density, and thus can be calculated as a constant in advance.

The aspect of the equation of FIG. 31 being able to execute the integration process mentioned above is shown in FIGS. 27-30. FIG. 27 is a general equation of a two-dimensional discrete Fourier transform, assuming an N×N element area. FIG. 28 is an equation expanded from the general equation of this two-dimensional discrete Fourier transform. FIG. 29 is a computational equation for computation of Fnew $(u, v)$, using Fold $(u, v)$ on the assumption that a targeted element $f(xi, yi)$ has changed from targeted element fold $(xi, yi)$ to fnew $(xi, yi)$. FIG. 30 is a simplified computational equation for computation utilizing the fact that $f(xi, yi)$ is "1." The fact that $f(xi, yi)$ is "1" means that the change of dot density is a one-dot increment in $f(xi, yi)$. FIG. 31 can be derived simply by multiplying each term of the computational equation of FIG. 30 by VTF $(u, v)$.

C-3. In the preceding embodiments, it was assumed that a single threshold value storage element varies; however, the present invention is also applicable to cases where, for example, a plurality of threshold value storage elements are determined or modified simultaneously. Specifically, for example, as in the preceding embodiments, where storage elements of threshold values up through the sixth have been determined, and storage elements of the seventh and eighth threshold values are now being determined, the storage elements can be determined on the basis of the evaluation value in the case that a dot was added to the storage element of seventh threshold value as well, and the evaluation value in the case that a dot was added respectively to the storage elements of the seventh and eighth threshold values; or the storage elements of the seventh threshold value only may be determined.

C-4. In the preceding embodiments the arrangement was such that storage elements of threshold values are determined in sequence; however, an arrangement whereby, for example, the dither matrix is generated by means of adjustment of a dither matrix as an initial state prepared in advance would be acceptable as well. For example, it would be acceptable to generate the dither matrix by preparing a dither matrix as an initial state of storing elements of a plurality of threshold values for the purpose of determining dot on/off states of pixels depending on input tone values; and to then replace some of the plurality of threshold values stored in the elements with threshold values stored at other elements, by either a random or systematically determined method, adjusting the dither matrix by determining on the basis of the evaluation values before and after replacement whether replacement has occurred.

The evaluation values before and after replacement can be calculated by a similar method to that described above, from the pre-replacement evaluation value and the level of change of the evaluation value associated with replacement, each time that replacement occurs. For example, the level of change of an evaluation value before and after replacement can be calculated using the level of change of the evaluation value due to disappearance of dots in association with replacement, and the level of change of the evaluation value due to addition of dots in association with replacement. Moreover, an arrangement whereby it is determined whether replacement has occurred, based on the sign (i.e. positive or negative) of the level of change of an evaluation value.

Thus, the present invention can be implemented as well in an arrangement wherein the dither matrix is generated by means of adjustment of a dither matrix as an initial state prepared in advance. The phrase "on a basis of the first evaluation value and the second evaluation value" appearing in the Claims is used in a broad sense to include "on a basis of the level of change of the evaluation values." This is because the second evaluation value is determined on the basis of the first evaluation value and the level of change of the evaluation value, so the two are mathematically equivalent.

C-5. The present invention can minimize the volume of processing of evaluation computations in the optimization process, and thus can be implemented irrespective of the optimization method. For example, it can be implemented broadly to the techniques of simulated annealing or genetic algorithms.

The present application claims priority based on Japanese Patent Application JP-A-2005-369229 (filing date Dec. 22, 2005) and U.S. patent application Ser. No. 11/350374 incorporated herein by reference.

What is claimed is:

1. A method of generating a dither matrix that stores each of a plurality of threshold values in each of elements for determining a status of dot formation of each print pixel of a print image to be produced on a printing medium by carrying out halftone processing on image data, the method comprising:
  determining a second evaluation value for a second dot status based on a first evaluation value and an evaluation value change level, the first evaluation value being for a first dot status prior to determination of a storage element of a targeted threshold value among the plurality of threshold values, the second dot status hypothetically presuming that the storage element of the targeted threshold value has been determined, the evaluation value change level representing a level of variation of the evaluation value associated with change from the first dot status to the second dot status;
  determining the storage element that stores the targeted threshold value based on the determined second evaluation value; and
  repeating the determining the second evaluation value and the determining the storage element, for at least part of the plurality of threshold values,
  wherein each operation of the method of generating the dither matrix is executed by a computer.

2. The dither matrix generating method according to claim 1, further comprising:
  determining a targeted threshold value from among a plurality of threshold values to be stored in elements of the dither matrix, the threshold value being one for which the element for storage is yet underdetermined and having the highest tendency for dot formation to turn ON,
  wherein the repeating includes repeating the determining the second evaluation value, the determining the storage element, and the determining the targeted threshold value, for all of the plurality of threshold values.

3. The dither matrix generating method according to claim 1, further comprising:
  preparing a dither matrix as an initial state dither matrix storing a plurality of threshold values in elements, for determining a status of dot formation of each of pixels in response to input tone value; and
  replacing a part of the plurality of threshold values stored in the elements with threshold values stored in other elements;
  wherein the determining the storage element determines the targeted threshold value on a basis of the first evaluation value and the second evaluation value;
  the first dot status is a dot status prior to the replacement;
  the second dot status is a hypothetical dot status after the replacement; and
  the repeating includes repeating the replacing, the determining the second evaluation value, and the determining the storage element, for at least part of the plurality of threshold values.

4. The dither matrix generating method according to claim 1, wherein
  the evaluation value is RMS granularity calculated by a computation process that includes a low pass filter process; and
  the evaluation value change level is calculated by performing computation for a plurality of elements belonging to a range affected by the low pass filter process in a change in dot status from the first dot status to the second dot status.

5. The dither matrix generating method according to claim 4, wherein
  the low pass filter process is performed using a low pass filter constituted by inverse Fourier transformation of prescribed characteristics defined in a two-dimensional frequency space.

6. The dither matrix generating method according to claim 1, wherein
  the evaluation value is a graininess evaluation value calculated by a computational process that includes a Fourier transformation process; and
  the evaluation value change level is calculated as a product of a VTF function determined on a basis of visual spatial frequency characteristics, and a constant pre-calculated by the Fourier transformation process.

7. A printing apparatus for performing printing on a printing medium, comprising:
  a dot data generator that performs a halftone process on image data representing a input tone value of each of pixels constituting an original image, for generating dot data representing a status of dot formation on each of print pixels of a print image to be formed on the print medium; and
  a print image generator that forms a dot on each of the print pixels for generating the print image according to the dot data, wherein
  the halftone process determines the status of dot formation on each of the print pixels using the dither matrix generated using the dither matrix generating method in claim 1.

8. A printing method of performing printing on a printing medium, comprising:

performing a halftone process on image data representing a input tone value of each of pixels constituting an original image, for generating dot data representing a status of dot formation on each of print pixels of a print image to be formed on the print medium; and forming a dot on each of the print pixels for generating the print image according to the dot data, wherein the halftone process determines the status of dot formation on each of the print pixels using the dither matrix generated using the dither matrix generating method in any of claims 1 to 5.

9. An apparatus for generating a dither matrix that stores each of a plurality of threshold values in each of elements for determining a status of dot formation of each print pixel of a print image to be produced on a printing medium by carrying out halftone processing on image data, the apparatus comprising:

an evaluation value determiner that determines determining a second evaluation value for a second dot status based on a first evaluation value and an evaluation value change level, the first evaluation value being for a first dot status prior to determination of a storage element of a targeted threshold value among the plurality of threshold values, the second dot status hypothetically presuming that the storage element of the targeted threshold value has been determined, the evaluation value change level representing a level of variation of the evaluation value associated with change from the first dot status to the second dot status; and a storage element determiner that determines the storage element that stores the targeted threshold value based on the determined second evaluation value.

10. A computer program product for causing a computer to generate a dither matrix that stores each of a plurality of threshold values in each of elements for determining a status of dot formation of each print pixel of a print image to be produced on a printing medium by carrying out halftone processing on image data, the computer program product comprising:

a non-transitory computer readable medium; and a computer program stored on the non-transitory computer readable medium, the computer program comprising:

a first program for causing the computer to determine a second evaluation value for a second dot status based on a first evaluation value and an evaluation value change level, the first evaluation value being for a first dot status prior to determination of a storage element of a targeted threshold value among the plurality of threshold values, the second dot status hypothetically presuming that the storage element of the targeted threshold value has been determined, the evaluation value change level representing a level of variation of the evaluation value associated with change from the first dot status to the second dot status;

a second program for causing the computer to determine the storage element that stores the targeted threshold value based on the determined second evaluation value; and a third program for causing the computer to repeat the determining the second evaluation value and the determining the storage element, for at least part of the plurality of threshold values.

* * * * *